(12) United States Patent
Samata et al.

(10) Patent No.: US 6,898,551 B2
(45) Date of Patent: May 24, 2005

(54) SYSTEM FOR PREDICTING LIFE OF A ROTARY MACHINE, METHOD FOR PREDICTING LIFE OF A MANUFACTURING APPARATUS WHICH USES A ROTARY MACHINE AND A MANUFACTURING APPARATUS

(75) Inventors: Shuichi Samata, Yokohama (JP); Yukihiro Ushiku, Yokohama (JP); Akihito Yamamoto, Yokohama (JP); Takashi Nakao, Kawasaki (JP); Takeo Furuhata, Yokkaichi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 42 days.

(21) Appl. No.: 10/418,275

(22) Filed: Apr. 18, 2003

(65) Prior Publication Data

US 2004/0064291 A1 Apr. 1, 2004

(30) Foreign Application Priority Data

Sep. 30, 2002 (JP) .................................. P2002-287265

(51) Int. Cl.$^7$ .......................... G21C 17/00; G06F 19/00
(52) U.S. Cl. .......................... 702/182; 702/34; 702/56; 702/185; 702/190
(58) Field of Search ................................. 702/141, 145, 702/147, 33, 34, 56, 76, 77, 182, 183, 185, 190; 73/660

(56) References Cited

U.S. PATENT DOCUMENTS

| | | | | |
|---|---|---|---|---|
| 5,109,700 A | * | 5/1992 | Hicho | 73/660 |
| 5,146,417 A | * | 9/1992 | Watson | 702/85 |
| 6,098,022 A | * | 8/2000 | Sonnichsen et al. | 702/35 |
| 2002/0193891 A1 | | 12/2002 | Ushiku | 700/21 |
| 2003/0009311 A1 | | 1/2003 | Ushiku et al. | 702/184 |

FOREIGN PATENT DOCUMENTS

| | | |
|---|---|---|
| JP | 11-062846 | 3/1999 |
| JP | 2000-259222 | 9/2000 |

OTHER PUBLICATIONS

Copy of U.S. Application for Shuichi Samata et al., "Method for Diagnosing Life of Manufacturing Equipment Using Rotary Machine", U.S. Appl. No. 10/228,111, filed Aug. 27, 2002.
Copy of U.S. Application No. Shuichi Samata et al., "Method for Predicting Life Span of Rotary Machine Used in Manufacturing Apparatus and Life Predicting System", U.S. Appl. No. 10/229,005, filed Aug. 28, 2002.
Copy of U.S. Application for Ken Ishii et al., "Method for Avoiding Irregular Shutoff of Production Equipment and System and for Avoiding Irregular Shutoff", U.S. Appl. No. 10/228,110, filed Aug. 27, 2002.

* cited by examiner

*Primary Examiner*—Bryan Bui
(74) *Attorney, Agent, or Firm*—Finnegan, Henderson, Farabow, Garrett & Dunner, L.L.P.

(57) ABSTRACT

A system for predicting life of a rotary machine, includes a vibration gauge configured to measure time series data of a peak acceleration of the rotary machine; a band pass filter configured to filter an analog signal of the time series data of the peak acceleration measured by the vibration gauge in a frequency band including a first analysis frequency expressed as a product of an equation including a number of rotor blades of the rotary machine and a normal frequency unique to the rotary machine; and a data processing unit configured to predict a life span of the rotary machine by characteristics of the filtered analog data of the time series data of the peak acceleration with the first analysis frequency.

12 Claims, 7 Drawing Sheets

SYSTEM FOR PREDICTING LIFE OF A ROTARY MACHINE, METHOD FOR PREDICTING LIFE OF A MANUFACTURING APPARATUS WHICH USES A ROTARY MACHINE AND A MANUFACTURING APPARATUS

CROSS REFERENCE TO RELATED APPLICATIONS

This application is based upon and claims the benefit of priority from prior Japanese Patent Application P2002-287265 filed on Sep. 30, 2002; the entire contents of which are incorporated by reference herein.

BACKGROUND OF THE INVENTION

1. Field of the Invention

The present invention relates to prediction techniques relating to the life span of a manufacturing apparatus which uses a rotary machine. In particular, the invention relates to a system for predicting the life of the rotary machine, a method for predicting the life of the manufacturing apparatus which uses the rotary machine and a manufacturing apparatus including the rotary machine.

2. Description of the Related Art

Failure diagnosis has become important to ensure efficient semiconductor device manufacturing. In recent years, especially as the trend towards small volume production of many different items of system LSI increases, an efficient yet highly adaptable semiconductor device manufacturing method has become necessary. It is possible to use a plurality of small-scale production lines adapted for miscellaneous purposes in view of the efficient production of different semiconductor devices. However, if many small-scale production lines are constructed by merely miniaturizing large-scale production lines, investment efficiency may be reduced due to a decrease in the rate of manufacturing apparatus utilization. To rectify this situation, there is a method whereby different manufacturing processes are performed by one piece of manufacturing equipment. For example, in a LPCVD apparatus using a dry pump for the evacuation system, reactive gases and reaction products differ and formation situations for the reaction products within the dry pump differ depending on the type of manufacturing processes. Therefore, the manufacturing process affects the life of the dry pump.

If the dry pump should have a failure during a specific manufacturing process, then the lot products being processed will be defective. Moreover, excessive maintenance of the manufacturing apparatus may become necessary due to microscopic dust caused by residual reactive gases within the manufacturing apparatus. Implementation of such excessive maintenance causes the manufacturing efficiency of the semiconductor device to drop dramatically. If regular maintenance is scheduled with a margin of safety in order to prevent such sudden failures during the manufacturing process, the frequency of maintenance work on the dry pump may become astronomical. Not only does this increase maintenance costs, but also the decrease in availability of the semiconductor manufacturing apparatus is conspicuous due to changing the dry pump, which causes the manufacturing efficiency of the semiconductor device to decline sharply. In order to use a common semiconductor manufacturing apparatus for a plurality of processes, as is necessary for an efficient small-scale production line, it is desirable to accurately diagnose vacuum pump life and to operate the dry pump without having any wasted time.

Previously, some methods of diagnosing dry pump life have been proposed. Basically, a state of the dry pump may be monitored by characteristics such as the motor current, vibration, and temperature, and methods have been provided to predict the pump life from variations in these characteristics (refer to Japanese Patent Application P2000-259222). In particular, dry pump life span diagnosis methods have mainly been provided by monitoring the state of the dry pump through vibrations caused by the rotation of a rotor. Since a diagnosis using the vibration can be accomplished through measurements taken by merely attaching an accelerometer to a side of the dry pump, it has gained attention as a simple and easy method for predicting pump life span. In addition, a method for predicting life span has been proposed whereby acoustic emission signals as vibration data are analyzed using an analog-to-digital (A/D) conversion (refer to Japanese Patent Application H11-62846).

Figure 1:
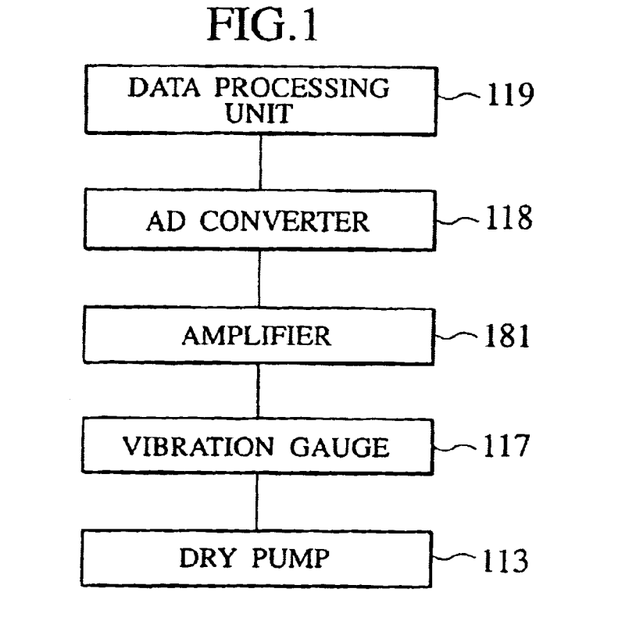
FIG. 1 is a schematic diagram of a life predicting system according to an earlier example.

Residue of reaction products accumulated inside the dry pump may be determined by a variation of a frequency of integral multiples of a normal vibration frequency to be characteristics for the dry pump instead of the normal vibration frequency of the dry pump. In a method for predicting life of the rotary machine according to an earlier example, as shown in FIG. 1, a signal from a vibration gauge 117 measuring a vibration of a dry pump 113 is amplified in an amplifier 181 and converted into a digital signal in an analog-digital (A/D) converter 118. Then, only a particular frequency component is taken out after Fourier transform in data processing unit 119.

In the method for taking out a particular frequency component by the Fourier transform from the digital signal converted by the A/D converter, there is problems that a quantity of data to process is enormous and a vibration variation with an extremely short time of less than or equal to one second cannot be evaluated. In addition, the measurement system becomes large in scale, and high in cost. Furthermore, a phenomenon occurs in which a peak frequency of the vibration fluctuates when reaction products have accumulated in the dry pump. Therefore, it is necessary to provide a method to evaluate peak acceleration precisely, even when the peak frequency fluctuates.

As mentioned above, in the method for predicting a life of a dry pump using a vibration according to the earlier example, there is a problem in the cost of the measurement system, the quantity of data, an interval between the measurement time and stability of the process. It is desired to provide a life prediction method having a simple and easy procedure which is highly stable and accurate, in an inexpensive measurement system.

SUMMARY OF THE INVENTION

A first aspect of the present invention inheres in a system for predicting life of a rotary machine, and includes: a vibration gauge configured to measure time series data of a peak acceleration of the rotary machine; a band pass filter configured to filter an analog signal of the time series data of the peak acceleration measured by the vibration gauge in a frequency band including a first analysis frequency expressed as a product of an equation including a number of rotor blades of the rotary machine and a normal frequency unique to the rotary machine; and a data processing unit configured to predict a life span of the rotary machine by characteristics of the filtered analog data of the time series data of the peak acceleration with the first analysis frequency.

A second aspect of the present invention inheres in a method for predicting the life of a manufacturing apparatus, and includes: measuring time series data of a peak acceleration of the rotary machine; filtering an analog signal of the time series data of the peak acceleration measured by the vibration gauge in a frequency band including a first analysis frequency expressed as a product of an equation including a number of rotor blades of the rotary machine and a normal frequency unique to the rotary machine; and predicting a life span of the rotary machine by characteristics of the filtered analog data of the time series data of the peak acceleration with the first analysis frequency.

A third aspect of the present invention inheres in a manufacturing apparatus, and includes: a rotary machine performing a manufacturing process; a vibration gauge configured to measure time series data of a peak acceleration of the rotary machine; a band pass filter configured to filter an analog signal of the time series data of the peak acceleration measured by the vibration gauge in a frequency band including a first analysis frequency expressed as a product of an equation including a number of rotor blades of the rotary machine and a normal frequency unique to the rotary machine; and a data processing unit configured to predict a life span of the rotary machine by characteristics of the filtered analog data of the time series data of the peak acceleration with the first analysis frequency

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Figure 2:
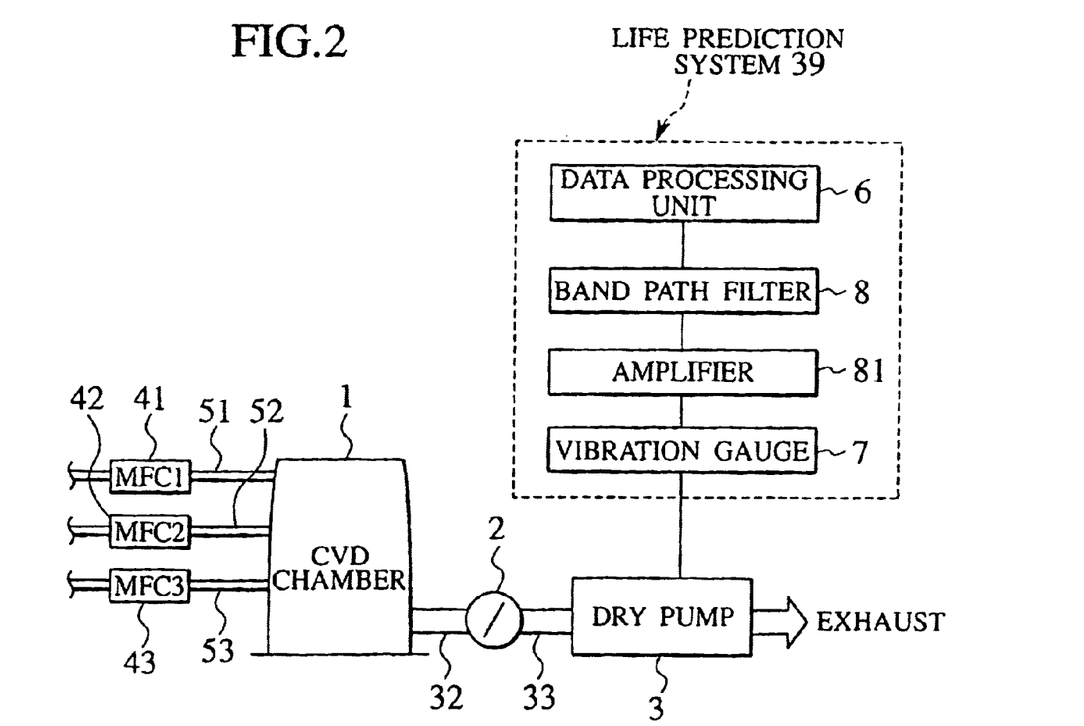
FIG. 2 is a schematic diagram of a semiconductor manufacturing apparatus according to an embodiment of the present invention.

A low-pressure chemical vapor deposition (LPCVD) apparatus as a semiconductor manufacturing apparatus according to an embodiment of the present invention is shown in FIG. 2. The apparatus includes a dry pump 3 as a rotary machine for evacuating a CVD chamber 1, and a life prediction system 39 for predicting a life of the dry pump 3.

The life prediction system 39 includes a vibration gauge 7 for measuring time-series data for characteristics of an acceleration of a vibration and is located on a side surface of the dry pump 3. An amplifier 81 amplifies the time series data of the acceleration detected by the vibration gauge 7. A band pass filter 8 filters the time series acceleration data amplified in the amplifier 81 in a frequency band, and a data processing unit 6 generates a variation of the characteristics of the vibration corresponding to an analysis frequency from the filtered time series acceleration analog data as diagnosis data so as to predict a life span of the dry pump 3.

In the LPCVD apparatus, gas conduits 51, 52, and 53 are connected to a CVD chamber 1. These gas conduits 51, 52, and 53 are connected to mass flow controllers 41, 42, and 43, respectively, which control various source gases and carrier gas introduced into the CVD chamber 1. More specifically, source gases and the like having their flow controlled by mass flow controllers 41, 42, and 43 are introduced into the CVD chamber 1 under fixed low-pressure conditions via gas conduits 51, 52, and 53. The CVD chamber 1 has an airtight structure capable of preventing inflow of outside air and maintaining an atmosphere therein. In order to evacuate the CVD chamber 1 using a dry pump 3, vacuum conduit 32 is connected to the exhaust side of the CVD chamber 1, and a gate valve 2 is connected to the exhaust side of the vacuum conduit 32. Another vacuum conduit 33 is further connected to the exhaust side of the gate valve 2. The suction side of the dry pump 3 is connected to the exhaust side of the vacuum conduit 33. The gate valve 2 separates the CVD chamber 1 and the dry pump 3 and adjusts exhaust gas flow, if necessary. The dry pump 3 is used for evacuating not-reacted source gases and reaction products introduced into the CVD chamber 1.

For example, in the case of depositing a silicon nitride ($Si_3N_4$) film using the LPCVD apparatus shown in FIG. 2, dichlorosilane ($SiH_2Cl_2$) gas and ammonia ($NH_3$) gas are respectively introduced via the mass flow controllers 41 and 42 into the CVD chamber 1 under low-pressure conditions. Inside the CVD chamber 1, a silicon (Si) substrate is heated to approximately 800° C., and through the chemical reaction of the $SiH_2Cl_2$ gas and $NH_3$ gas, an $Si_3N_4$ film is deposited on the Si substrate. In addition to generating the $Si_3N_4$ film, this reaction produces reaction by-products of ammonium chloride ($NH_4Cl$) gas and hydrogen ($H_2$) gas. Since $H_2$ is a vapor, it can be evacuated through the dry pump 3. On the other hand, since the temperature of the Si substrate in the reactor is approximately 800° C. and it is under a low-pressure of approximately several hundred Pa or less at the time of formation, $NH_4Cl$ is also in a vapor phase.

While it is omitted from the drawings, an LPCVD apparatus typically has a trap located between the CVD chamber 1 and the dry pump 3 for collecting solid reaction by-products. With this trap, it is impossible to completely collect the reaction by-product under low-pressure conditions. The reaction by-product that is not collected reaches the dry pump 3. Pressure in the dry pump 3 increases from approximately 0.1 Pa to normal atmospheric pressure due to the compression of the gas. The reaction by-product being in a vapor phase under low-pressure conditions begins to solidify in accordance with the sublimation curve of the phase diagram as pressure increases. In the dry pump 3, since the pressure changes from several hundred Pa of pressure to normal atmospheric pressure by repeating compression of the gas, the gaseous reaction by-product within the exhaust gas begins to solidify in the dry pump 3 as the pressure increases. When solidification begins in the conduit of the dry pump 3, although it is a minute amount, the deposited material causes elastic deformation of a rotational axis of the dry pump 3. This effect results in dry pump failure.

Figure 3:
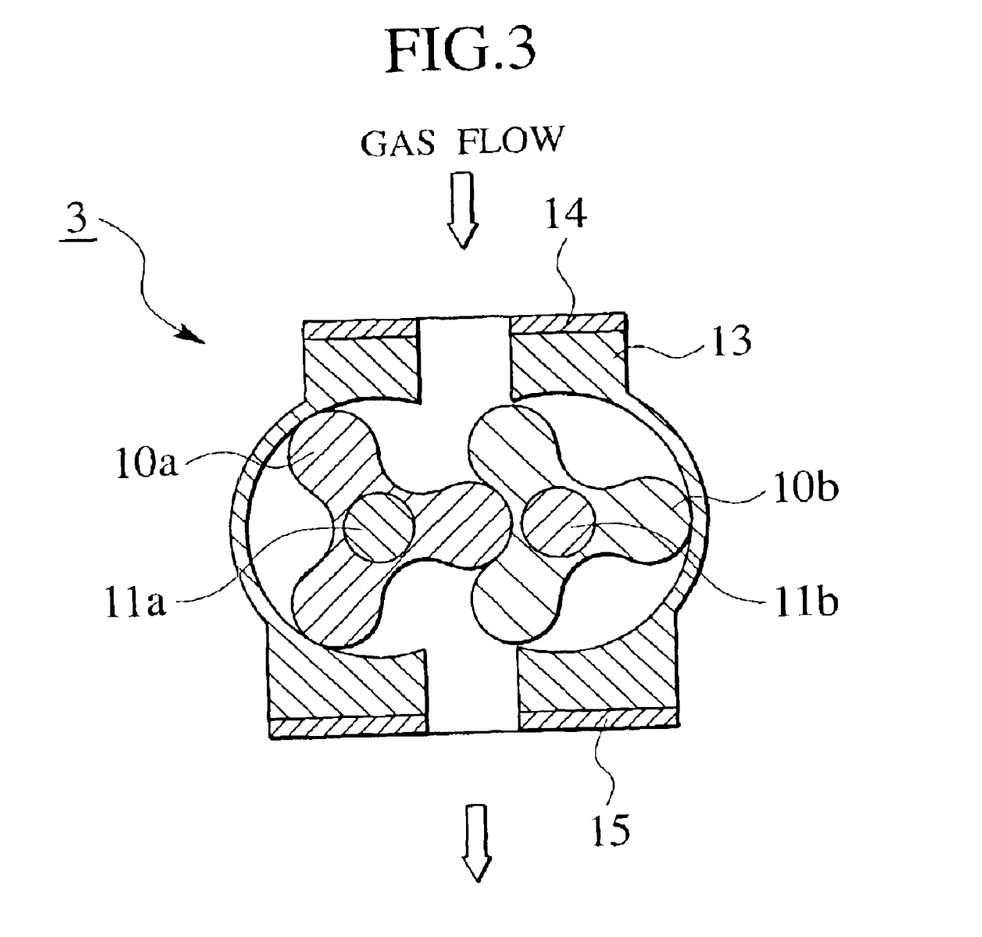
FIG. 3 is a cross-sectional diagram showing an internal configuration of a rotary machine as a dry pump shown in FIG. 2.

As shown in FIG. 3, the dry pump 3 used in the LPCVD apparatus according to the embodiment is constructed with two three-bladed rotors 10a and 10b, which rotate around rotational axes 11a and 11b, respectively. The dry pump 3 includes a body 13, a suction flange 14 provided on a suction side of the body 13, and an exhaust flange 15 provided on an exhaust side of the body 13. The gas flow coming from the CVD chamber 1 via the gate valve 2 enters the dry pump 3 through the suction flange 14. The gas that enters the dry pump 3 is compressed through the rotation of the two rotors 10a and 10b around the rotational axes 11a and 11b. The compressed gas is evacuated through the exhaust flange 15. In addition, the vibration gauge may be attached, for example to a planar portion of the body 13 of the dry pump 3 with a magnet.

In the dry pump 3, distances between the rotors 10a and 10b, or between the rotors 10a, 10b and an inner wall of the body 13 is equal to or less than 1 mm. When depositing, for example, an $Si_3N_4$ film on a Si substrate, reaction by-products including mainly $NH_4Cl$ are depositd inside the dry pump 3, and blocks up the space between the rotors 10a and 10b, or between the rotors 10a, 10b and an inner wall of the body 13. When the reaction by-products rub between the rotors 10a and 10b, or between the rotors 10a, 10b and an inner wall of the body 13, a characteristic vibration caused by friction occurs. Therefore, by measuring a transition of characteristics for the vibration of the dry pump 3 by the vibration gauge 7, a life span of the dry pump 3 can be predicted by monitoring the conditions of the reaction by-products accumulated inside the dry pump 3.

Since the rotors 10a and 10b are rotated by a motor with a power supply frequency of 50 Hz, a frequency of a normal vibration measured by vibration gauge 7 is also 50 Hz. Additionally, by rotating the rotors 10a, 10b around each of the rotational axes 11a, 11b, vibrations which are integral multiples of the frequency of normal vibration may arise. In addition, since the clearances between the rotors 10a and 10b, or between the rotors 10a, 10b and an inner wall of the body 13 are asymmetric, the reaction by-products accumulated inside the dry pump 3 rub inhomogeneously between the rotors 10a and 10b, or between the rotors 10a, 10b and an inner wall of the body 13. As a result, sub-peaks of vibration frequency aside from frequency of the normal vibration caused by a rotation of the rotors 10a, 10b and integral multiples of the normal vibration are observed in a frequency spectrum of acceleration measured by the vibration gauge 7 when the reaction by-products have accumulated in the dry pump 3.

For example, under a normal condition, the peaks of integral multiples of the frequency of the normal vibration are distinctly observed, and the sub-peaks are not clearly seen. When the reaction by-products accumulate inside the dry pump 3 and shutdown of the dry pump 3 is imminent, the sub-peaks appear. The sub-peaks that appear just before failure, are particularly sensitive to accumulation of the reaction by-products inside the dry pump 3. The frequency of the main sub-peaks that are effective for monitoring the blockage created by the reaction by-products inside the dry pump 3, is experimentally expressed by (n+l/m) times of the normal vibration. Here, m is the number of the blades of the rotors 10a, 10b, and n, l are arbitrary positive integers. However, the relationship of $n \leq \{m*[\text{number of axis}]+1\}$ is necessary so that sensitivity deteriorates when n is large.

The condition created by the accumulation of reaction by-products inside the dry pump 3 can be seen in a vibration variation of a frequency characteristic of the dry pump 3, such as the peaks of integral multiples of the frequency of the normal vibration or the sub-peaks as compared to the peak of the normal vibration. Therefore, it is important in the life prediction of the dry pump 3 to measure an acceleration variation of the vibration of a specific frequency other than the normal vibration. Thus, generally, in acceleration measurement of a vibration, a method is used, in which a specific frequency component is provided by Fourier transform for a digital signal converted using an A/D converter from a signal measured by the vibration gauge 7. In the method using the A/D converter, since vibration data of a wide range of frequency bands are covered for A/D conversion, the amount of data to process becomes enormous. Furthermore, a vibration variation with an extremely short time of less than or equal to one second cannot be detected because the AD conversion or Fourier transform processing requires more time than vibration variation time. In a measurement for determining a transition of the vibration, for example, time series data of acceleration of the dry pump 3 for a predetermined amount of the acceleration data is sampled at predetermined time periods. Sampling of more than 4096 points is necessary for each measurement in view of a signal/noise (S/N) ratio. When vibration data of analysis frequency are sampled, sampling time, for example, can be shortened to 1 millisecond, but the number samplings is more than 4096 points. Therefore, in the method of analyzing by A/D conversion and Fourier transform, a necessary time interval for each measurement is at least four or five seconds.

In particular when the accumulated reaction by-products increase inside of dry pump 3, friction between the rotors 10a and 10b, or between the rotors 10a, 10b and an inner wall of the body 13 increases. In addition, the reaction by-products accumulated in a conduit at the suction side of the dry pump 3 fall off and are taken inside the dry pump 3. A spike-like variation with an extremely short time of less than or equal to one second occurs in the measured vibration. Therefore, in detection of an abnormality, i.e., the life prediction of the dry pump 3, measurement and analysis within an extremely short time is important. In the measurement of a transition of the vibration, for example, the time series data of the acceleration of the analysis frequency of the dry pump 3, the time period for measuring is set smaller to detect a short-time variation. However, in general, it is difficult to measure the short-period variation. In addition, in order to detect the abnormality with high reliability, a measurement time period equal to or less than $1/(3*f)$ seconds is desirable, where f is the analysis frequency in Hz. In the embodiment of the present invention, the time period for measuring the time series acceleration data is 0.001 seconds.

In a life prediction of the dry pump 3 according to the embodiment of the present invention, the vibration data of an analysis frequency band are measured so that analog signals provided by the vibration gauge 7 are not processed by the A/D conversion, but pass through a filtering circuit such as the band pass filter 8. When the reaction by-products accumulated inside the dry pump 3, rub between the rotors 10a and 10b, or between the rotors 10a, 10b and the inner wall of the body 13, peak frequency of the vibration data decreases. A bandwidth of the frequency band of the band pass filter 8 is set to include a peak frequency variation. Therefore, the frequency band is determined to be a bandwidth of approximately 2 to 10 times a sum of a half bandwidth of the peak acceleration and a maximum variation of the peak frequency caused by the accumulation of the reaction by-products. For example, in the embodiment of the present invention, the band pass filter 8 has a frequency band of 290–310 Hz which corresponds to a bandwidth equivalent to more than two times the sum of the half bandwidth of 3 Hz of the acceleration peak and a maximum peak frequency variation of 6 Hz is used. Then, a peak acceleration signal of a frequency of 300 Hz, which corresponds to six times the normal vibration, is filtered and analyzed in the data processing unit 6.

Figure 4:
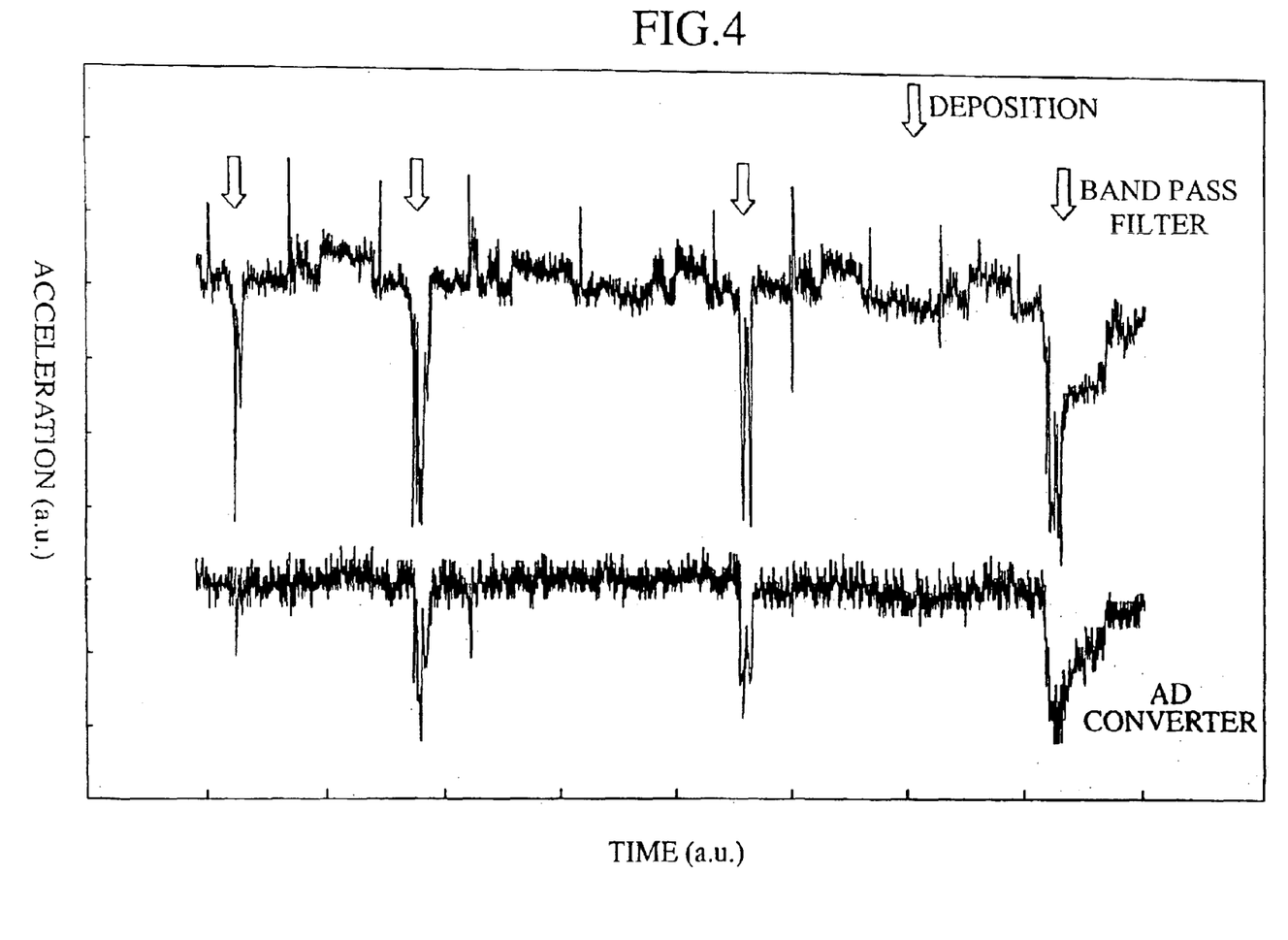
FIG. 4 is a graph showing the change over time of the peak acceleration measured by the life predicting system according to the embodiment of the present invention.

An acceleration transition of the vibration frequency at 300 Hz during the first to fourth film deposition steps performed a few days prior to the day of failure of the dry pump 3 is shown in FIG. 4. In the life prediction system using the band pass filter 8 according to the embodiment of the present invention, decreases of the peak acceleration is observed in all the first to fourth film deposition steps. In FIG. 4, an example measured simultaneously by the life prediction system using the A/D converter, is shown for comparison. The output acceleration signal read out from the same vibration gauge 7, is branched so as to convert to a digital signal in the A/D converter. Then, the digital signal is divided into a frequency component by fast Fourier transform and a peak acceleration transition for a frequency of 300 Hz is analyzed. In the method using the A/D conversion, as shown in FIG. 4, a peak acceleration signal is not seen in the first film deposition step. In the method using the A/D conversion, the sampling time is 1 millisecond, which is the same as the method according to the embodiment of the present invention. However, 4.5 second is the limit for the measurement interval, since the number of samplings is 4096 points and additional time for the A/D conversion and Fourier transform is necessary. Therefore, an acceleration variation having a short period of less than or equal to one second is difficult to measure. The amount of the digital signals using the A/D conversion is approximately 100 times larger compared with the analog signals using the band pass filter 8. In addition, the data processing time of the digital signals using the A/D conversion increases more than ten times compared with the band pass filter 8.

In the embodiment of the present invention, the amount of the time series data of the acceleration can be decreased by the band pass filter 8 and narrowing a bandwidth of analysis frequency. In addition, measurement time can be shortened, also. Therefore, the vibration variation of the peak acceleration can be measured with high stability, reliability and accuracy.

Figure 5:
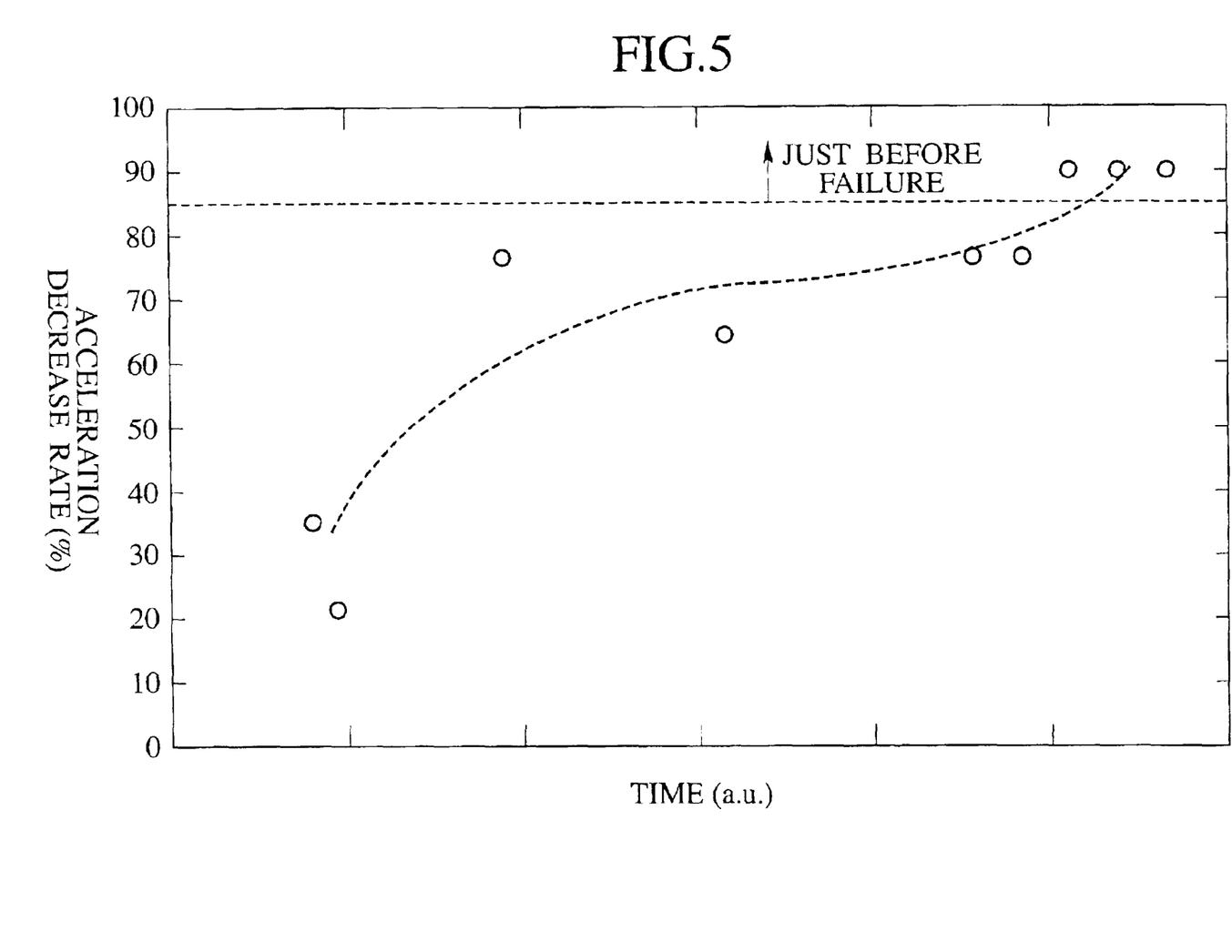
FIG. 5 is a graph showing the change over time of the peak acceleration decrease rate measured by the life predicting system according to the embodiment of the present invention.

For example, the acceleration transition for a frequency of 300 Hz from a stage just after pump replacement through the failure of the dry pump 3 caused by accumulation of the reaction by-products inside the dry pump 3, is shown in FIG. 5. According to the life prediction system 39 of the embodiment of the present invention, a decrease rate of peak acceleration in the film deposition step increases with an increase of the accumulated reaction by-products inside the dry pump 3, as shown in FIG. 5. Therefore, it is possible to predict a life span of the dry pump 3. For example, a life span of the dry pump 3 may be predicted using a point where the acceleration decrease rate is larger than 85%, as a threshold for "just before failure".

In addition, in the life prediction system 39 according to the embodiment of the present invention, as a substitute for the expensive A/D converter and Fourier analyzer, the simple band pass filter 8 is used. The band pass filter 8, for example, can be provided by combining plural parallel resonators connecting a capacitor and an inductor. Therefore, a configuration of the life prediction system 39 is simple and easy, furthermore, cost of the life prediction system 39 may decrease drastically.

Figure 6:
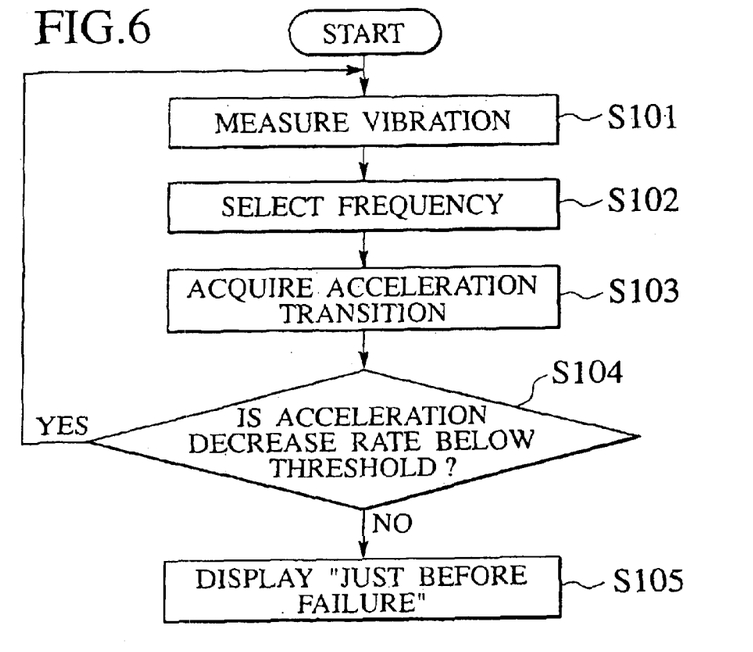
FIG. 6 is a flowchart for showing a life prediction method for the rotary machine used in the semiconductor manufacturing apparatus according to the embodiment of the present invention.

Next, using the flowchart shown in FIG. 6, the life prediction method for the rotary machine used in the manufacturing apparatus according to the embodiment of the present invention is described. More specifically, the life span is predicted for the dry pump 3 utilized in the LPCVD apparatus for depositing an $Si_3N_4$ film.

(a) To begin with, in step S101, the vibration (acceleration) time series data representing a transition of the dry pump 3 is measured by the vibration gauge 7 located on the side surface of the dry pump 3 of the LPCVD apparatus. For example, the acceleration time series data are measured at intervals of 1 ms.

(b) Next in step S102, the acceleration time series data obtained in step S101 is amplified by the amplifier 81. Using the amplified acceleration time series data, the analysis frequency component of the acceleration time series data is filtered and selected by the band pass filter 8. The filtering frequency band of the band pass filter 8 is in a range of 290 to 310 Hz, and the analysis frequency is 300 Hz.

(c) In step S103, using the selected analysis frequency component of the acceleration time series data, the peak acceleration time series analog data is calculated by the data processing unit 6.

(d) Thereafter, in step S104, using the peak acceleration time series analog data, the acceleration decrease rate is calculated by the data processing unit 6. The life span of the dry pump 3 is determined by comparing the calculated acceleration decrease rate with a threshold value. When the acceleration decrease rate is below the threshold value, the measurement processing is repeated from step S101.

(e) When the acceleration decrease rate exceeds the threshold, in step S105, the data processing unit 6 then displays an indication on a display device or display panel, or with a display lamp attached to the LPCVD apparatus showing "just before failure".

According to the life prediction method of the semiconductor manufacturing apparatus of the embodiment of the present invention, since the band pass filter 8 is used so as to filter and select the frequency band of the analysis frequency, an amount of the time series acceleration data may decrease, and the measurement time may be shortened. Therefore, the vibration transition of the peak acceleration and the like may be measured with high sensitivity, stability and accuracy. In the embodiment of the present invention, the "threshold" value for determining the indication of pump failure may be appropriately set in practical applications. In the life prediction method for a rotary machine used in a semiconductor manufacturing apparatus according to the first embodiment of the present invention, the life prediction for the dry pump 3 is performed using the peak acceleration at the sub-peak frequency of 300 Hz, which corresponds to six times of the normal vibration, as the analysis frequency. Alternatively, other vibration frequencies in which a variation of the peak acceleration is also observed may be used.

Modification of the Embodiment

Figure 7:
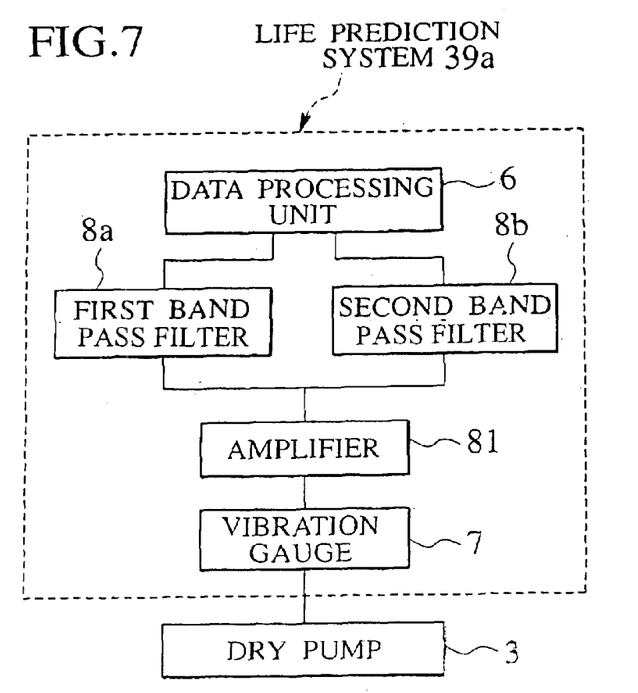
FIG. 7 is a schematic diagram of a life predicting system according to a modification of the embodiment of the present invention.

In a life prediction system 39a for a rotary machine used in a semiconductor manufacturing apparatus according to a modification of the embodiment of the present invention, as shown in FIG. 7, a first band pass filter 8a and a second band pass filter 8b are used.

In the embodiment of the present invention, the frequency, in which the peak acceleration variation detected by the vibration gauge 7 decreases with the accumulation of the reaction by-products inside the dry pump 3, has been used for explanation. However, depending on the frequency, a peak acceleration variation may increase adversely. Therefore, as the analysis frequency, a combination of the main sub-peaks where phases of the variation of the peak acceleration differ with one another with an increase and decrease depending on the accumulation of the reaction by-products inside the dry pump 3, is chosen. Here, the frequency of the sub-peak is {n+(l/m)} times the normal vibration (m is the number of blades of the rotors 10a, 10b, and n, l are arbitrary positive integers). Thus, the peak acceleration caused by the blockage of the reaction by-products accumulated inside the dry pump 3 during the deposition step, can be measured with high sensitivity, stability and accuracy. Therefore, according to a modification of the embodiment of the present invention, the life span of the dry pump 3 may be predicted with high reliability.

In the life prediction system 39a according to the modification of the embodiment of the present invention, the first and second band pass filters 8a, 8b are provided so as to analyze peak acceleration variations of the dry pump 3 with the combination of two different sub-peaks. Other points besides the above configuration are similar to those of the embodiment of the present invention. Thus, repetitive description thereof will be omitted.

The life prediction system 39a includes: a vibration gauge 7 for measuring time-series data for characteristics of an acceleration of a vibration, located on a side surface of the dry pump 3; an amplifier 81 amplifying the time series data of the acceleration detected by the vibration gauge 7; a first band pass filter 8a filtering the time series acceleration data amplified in the amplifier 81 in a frequency band including a first analysis frequency; a second band pass filter 8b filtering the time series acceleration data amplified in the amplifier 81 in a frequency band including a second analysis frequency; a data processing unit 6 generates a variation of the characteristics of the vibration corresponding to the first and second analysis frequencies from the filtered time series acceleration analog data as a diagnosis data, and predicting a life span of the dry pump 3. In addition, the frequency bands filtered in the first and second band pass filters 8a, 8b, are set so as to include the frequencies where the phases of the peak acceleration variations of dry pump 3 differ.

Figure 8:
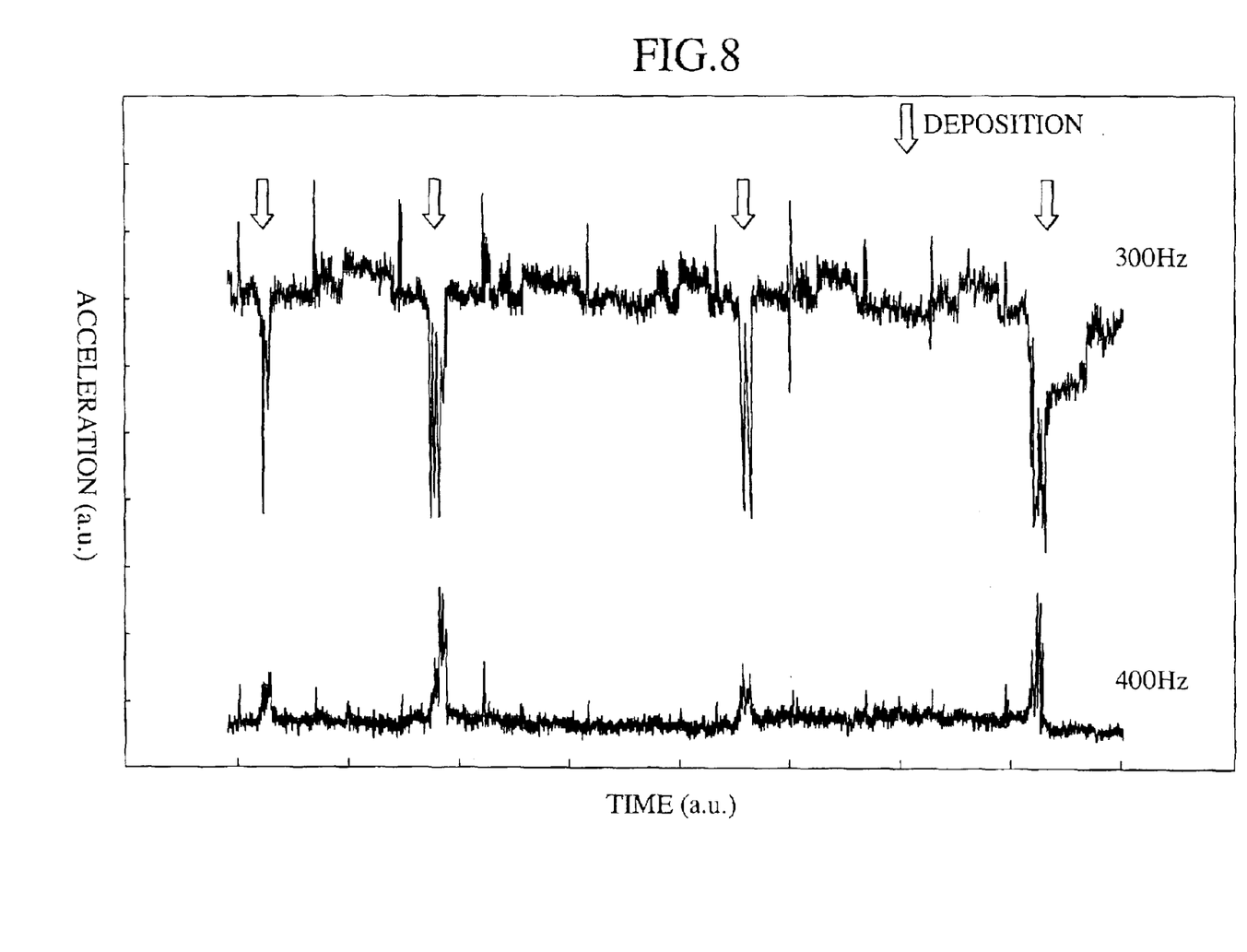
FIG. 8 is a graph showing the change over time of the peak acceleration measured by the life predicting system according to the modification of the embodiment of the present invention.

In the modification of the embodiment of the present invention, for example, the first analysis frequency of 300 Hz with a frequency band 290 to 310 Hz is filtered by the first band pass filter 8a, and the second analysis frequency of 400 Hz with a frequency band 390 to 410 Hz is filtered by the second band pass filter 8b. Then, peak acceleration transitions in the first and second analysis frequencies of 300 Hz and 400 Hz are measured. As shown in FIG. 8, the variation of the peak acceleration decreases at the first analysis frequency of 300 Hz, but adversely increases at the second analysis frequency of 400 Hz. The variation of the peak acceleration is affected by, for example, a variation in a gas flow rate and a vibration or a shock occurring to the apparatus, in addition to the accumulation of the reaction by-products inside the dry pump 3. The peak acceleration, caused by the reaction by-products inside the dry pump 3 can be precisely measured by using the first and second analysis frequencies, in which the phases of the variations of the peak acceleration differ. Thus, in the life prediction system 39a according to the modification of the embodiment of the present invention, the life span of the dry pump 3 may be predicted with higher reliability.

Other Embodiments

The present invention has been described as mentioned above. However the descriptions and drawings that constitute a portion of this disclosure should not be perceived as limiting this invention. Various alternative embodiments and operational techniques will become clear to persons skilled in the art from this disclosure In the embodiment of the present invention, the vibration gauge 7 is attached to the side surface of the body 13 of the dry pump 3, however, a top surface and a bottom surface of the body 13 are also suitable for placement of the vibration gauge 7. In addition, the vibration gauge 7 may be located on a top surface, a side surface, or a bottom surface of a gearbox (not shown in the figures) of the dry pump 3. An attaching face of the body 13 or the gearbox may be polished with machine precision so as to be the same as an attaching face of the vibration gauge 7, in order to assure stability of the acceleration measurement.

In addition, in the descriptions of the embodiment of the present invention, a Roots-type dry pump 3 is illustrated as an example of a rotary machine, however, it has been verified that similar results may be obtained with a screw-type dry pump. Using the sub-peak with a frequency of (n+l/m) times of the normal vibration, and the number of the rotor blades, m may set as one for the screw-type dry pump.

Figure 9:
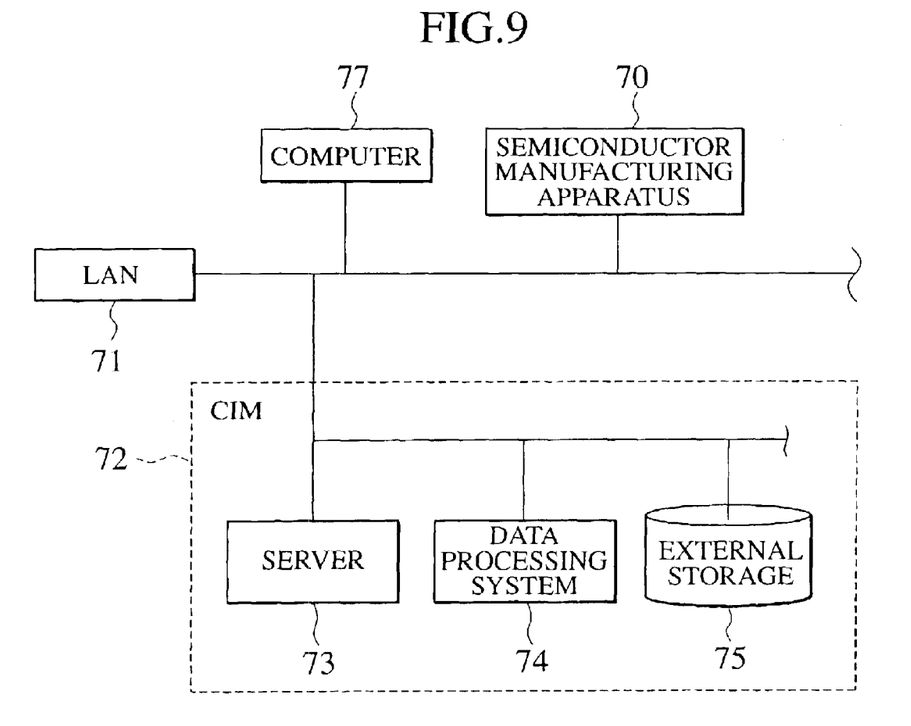
FIG. 9 is a block diagram showing a structural example of a semiconductor manufacturing system performing life prediction of a rotary machine according to another embodiment of the present invention.

In addition, in the embodiment of the present invention, the analysis for predicting the life span of the dry pump 3 is performed by the data processing unit 6 of the life prediction system 39 connected to the LPCVD apparatus, however, the life prediction analysis may be performed by another computer in the LPCVD apparatus. For example, it may be embedded in a controller (not shown in the figures) of the dry pump 3. Furthermore, as shown in FIG. 9, a semiconductor manufacturing system according to other embodiments of the present invention provides a semiconductor manufacturing apparatus 70 and a computer integrated manufacturing system (CIM) 72 and the like connected to a local area network (LAN) 71. The CIM 72 has a server 73, a data processing system 74 and an external storage unit 75, and the like, connected thereto. The life span determination analysis may also be performed by the data processing system 74 of the CIM 72 by transmitting measured time-series data via the LAN 71. Furthermore, the life span determination analysis may also be performed by the server 73 or another computer on the CIM 72. Moreover, storing the time-series data for the characteristics used in the life span determination analysis in the external storage unit 75 on the CIM 72 is also permissible.

Furthermore, in the above description, the case where an $Si_3N_4$ film is deposited through a reaction of $SiH_2Cl_2$ gas and $NH_3$ gas is provided. However, source gases are not limited to $SiH_2Cl_2$ gas and $NH_3$ gas. For example, hexachlorodisilane ($Si_2Cl_6$) gas and the like may be used instead of $SiH_2Cl_2$ gas. In addition, the example of LPCVD for an $Si_3N_4$ film should not be construed as limiting; LPCVD for thin films with other materials is similarly applicable. In addition, an example where a single type of thin film is grown is shown, however, similar effects may be obtained in the case of forming a thin film having a plurality of species, such as an $SiO_2$ film, TEOS oxide film, and polycrystalline silicon with the same LPCVD apparatus.

Moreover, it should be noted that an example of an LPCVD process is illustrated in the first through third embodiments of the present invention. In the present invention similar results have been confirmed in the case where the reaction by-product is deposited inside the dry pump resulting in the pump shutting down and may be applicable to CVD processes in general and to other processes such as the dry etching process.

What is claimed is:

1. A system for predicting life of a rotary machine, comprising:
    a vibration gauge configured to measure time series data of a peak acceleration of the rotary machine:
    a band pass filter configured to filter an analog signal of the time series data of the peak acceleration measured by the vibration gauge in a frequency band including a first analysis frequency expressed as a product of an equation including a number of rotor blades of the rotary machine and a normal frequency unique to the rotary machine, the equation expressed as [n+(l/m)], where m is the number of rotor blades, and n, l are arbitrary positive integers; and
    a data processing unit configured to predict a life span of the rotary machine by characteristics of the filtered analog data of the time series data of the peak acceleration with the first analysis frequency.

2. The system of claim 1, wherein the frequency band is set in a bandwidth of approximately 2 to 10 times a sum of a half bandwidth of the peak acceleration and a maximum variation of the peak frequency.

3. The system of claim 1, wherein a measurement time interval of the vibration measured by the vibration gauge is equal to or less than one third of a period of the first analysis frequency.

4. The system of claim 1, further comprising:
    another band pass filter configured to filter the analog signal of the time series data of the peak acceleration in another frequency band including a second analysis frequency being different in a variation phase of the peak acceleration from the first analysis frequency.

5. A method for predicting life of a manufacturing apparatus using a rotary machine, comprising:
    measuring time series data of a peak acceleration of the rotary machine;
    filtering an analog signal of the time series data of the peak acceleration measured by the vibration gauge in a frequency band including a first analysis frequency expressed as a product of an equation including a number of rotor blades of the rotary machine and a normal frequency unique to the rotary machine, the equation expressed as [n+(l/m)], where m is the number of rotor blades, and n, l are arbitrary positive integers; and
    predicting a life span of the rotary machine by characteristics of the filtered analog data of the time series data of the peak acceleration with the first analysis frequency.

6. The method of claim 5, wherein the frequency band is set in a bandwidth of approximately 2 to 10 times a sum of a half bandwidth of the peak acceleration and a maximum variation of the peak frequency.

7. The method of claim 5, wherein the time series data of the peak acceleration is measured by a time interval equal to or less than one third of a period of the first analysis frequency.

8. The method of claim 5, further comprising:
    filtering the analog signal of the time series data of the peak acceleration in another frequency band including a second analysis frequency being different in a variation phase of the peak acceleration from the first analysis frequency.

9. A manufacturing apparatus comprising:
    a rotary machine;
    a vibration gauge configured to measure time series data of a peak acceleration of the rotary machine;
    a band pass filter configured to filter an analog signal of the time series data of the peak acceleration measured by the vibration gauge in a frequency band including a first analysis frequency expressed as a product of an equation including a number of rotor blades of the rotary machine and a normal frequency unique to the rotary machine, the equation expressed as [n+(l/m)], where m is the number of rotor blades, and n, l are arbitrary positive; and
    a data processing unit configured to predict a life span of the rotary machine by characteristics of the filtered analog data of the time series data of the peak acceleration with the first analysis frequency.

10. The manufacturing apparatus of claim 9, wherein the frequency band is set in a bandwidth of approximately 2 to 10 times a sum of a half bandwidth of the peak acceleration and a maximum variation of the peak frequency.

11. The manufacturing apparatus of claim 9, wherein a measurement time interval of the vibration measured by the vibration gauge is equal to or less than one third of a period of the first analysis frequency.

12. The manufacturing apparatus of claim 9, further comprising:
    another band pass filter configured to filter the analog signal of the time series data of the peak acceleration in another frequency band including a second analysis frequency being different in a variation phase of the peak acceleration from the first analysis frequency.

* * * * *